UNITED STATES PATENT OFFICE.

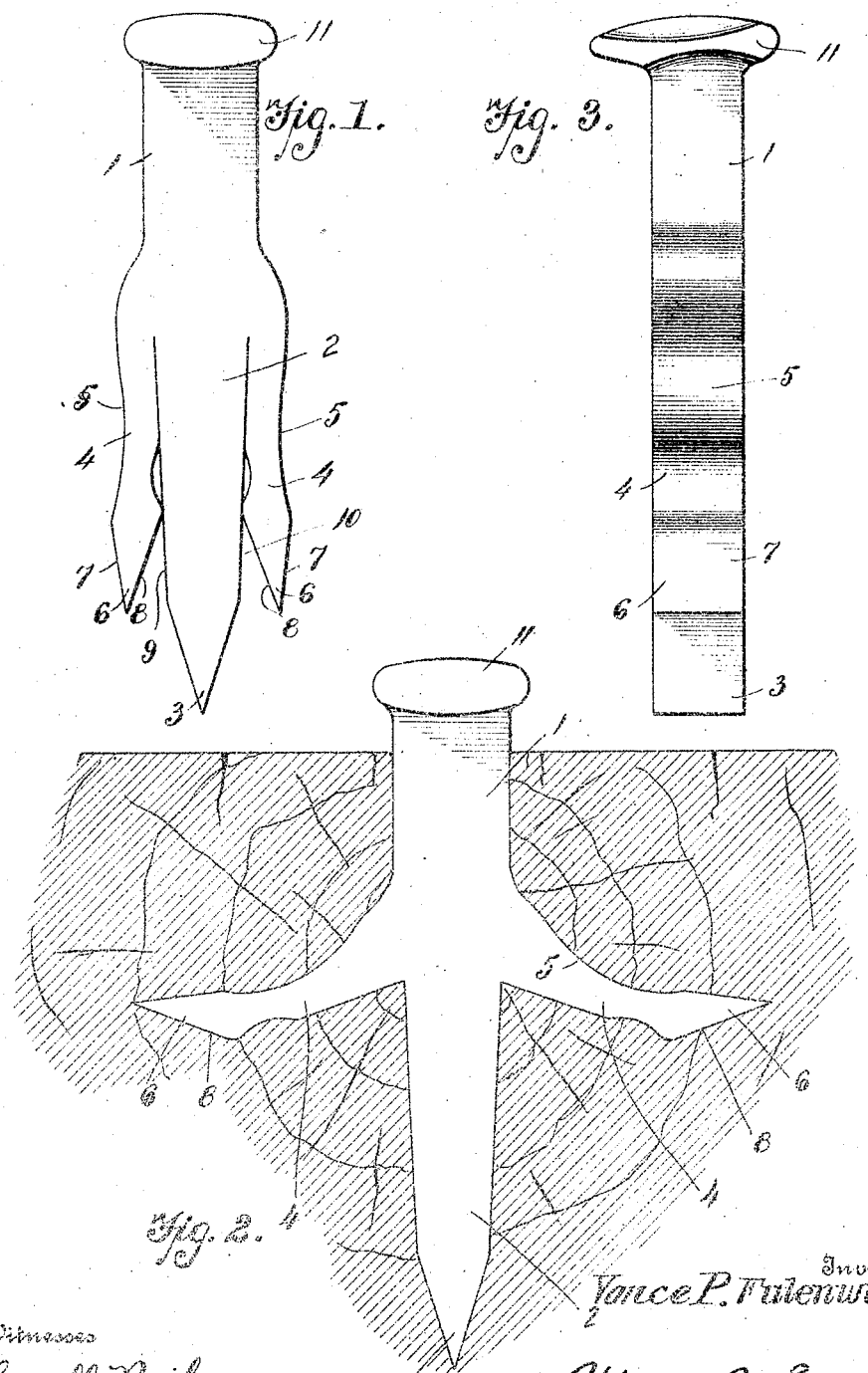

VANCE P. FULENWIDER, OF JONESBORO, ARKANSAS.

RAILROAD-SPIKE.

1,025,799.

Specification of Letters Patent. Patented May 7, 1912.

Application filed October 24, 1911. Serial No. 656,419.

*To all whom it may concern:*

Be it known that I, VANCE P. FULENWIDER, a citizen of the United States, residing at Jonesboro, in the county of Craighead and State of Arkansas, have invented new and useful Improvements in Railroad-Spikes, of which the following is a specification.

This invention relates to railroad spikes, or like fastenings, the object of the invention being to provide means for securely anchoring the spike to its support.

Another object of the invention is to provide a spike which will include prongs adapted to be deflected in opposite directions when driving the spike and to construct the prongs so as to insure their proper spreading to anchoring positions.

In the drawing, forming a portion of this specification and in which like numerals of reference indicate similar parts in the several views:—Figure 1 is a side view of the spike. Fig. 2 is a similar view showing the spike in its anchored position in the rail tie or object with which it is engaged. Fig. 3 is an edge view of the spike.

The spike comprises a main shank 1 and an auxiliary driving shank 2, the latter being tapered downwardly from the lower end of the main shank 1 and terminating in a driving point 3. The shank 1 is provided with integral side anchoring prongs 4 which are identically constructed. Each prong is provided substantially throughout its length with an outer concaved surface 5 and at the lower end each prong is provided with a pointed driving end 6 having the companion surfaces 7 and 8 which are arranged in intersecting planes, the inner surfaces 8 of the prong being longer than the outer surfaces 7, and as illustrated, they terminate at their upper ends approximately at the medial line of the auxiliary shank, being flared outwardly from the flared side surfaces of the shank 2 so as to provide relatively large substantially V-recesses 10 between the points of the prongs 4 and the shank 2.

The bevel surfaces of the point 3 at the lower end of the shank 2 terminate in planes slightly above the points of the prongs 4. This construction is such that the material displaced by the point 3 when the spike is driven into a rail tie or the like will be deflected in the direction of the surfaces 8 on the points of the prongs 4, causing the material to wedge between the inner surfaces of the points of the prongs 4 and the side surfaces of the shank 2. This effectively insures the rapid spreading of the prongs 4 to their anchored positions. By providing the prongs 4 with the concaved outer surfaces 5 I also provide for the effective and rapid spreading of the prongs to their anchored positions.

The main shank 1 is provided with a suitable driving head 11.

I claim:—

A spike comprising a main shank, an auxiliary shank thereon, the auxiliary shank being tapered downwardly and provided with a lower driving tapered point, and prongs forming an integral part of the main shank and extending downwardly against the sides of the auxiliary shank and provided with beveled inner surfaces which extend downwardly and away from the sides of the auxiliary shank, the walls of the tapered point of the auxiliary shank being extended in the direction of the beveled surfaces of the prongs, the outer surfaces of the said prongs being concaved longitudinally for the purpose described.

In testimony whereof I affix my signature in presence of two witnesses.

VANCE P. FULENWIDER.

Witnesses:
D. J. DAVY,
G. G. BROOKS.